(12) United States Patent
Kikuchi (10) Patent No.: US 12,291,084 B2
(45) Date of Patent: May 6, 2025

(54) VENTILATOR

(71) Applicant: Marelli Corporation, Saitama (JP)

(72) Inventor: Masami Kikuchi, Saitama (JP)

(73) Assignee: Marelli Corporation, Saitama (JP)

( * ) Notice: Subject to any disclaimer, the term of this patent is extended or adjusted under 35 U.S.C. 154(b) by 335 days.

(21) Appl. No.: 17/924,732

(22) PCT Filed: Jul. 7, 2021

(86) PCT No.: PCT/JP2021/025653
§ 371 (c)(1),
(2) Date: Nov. 11, 2022

(87) PCT Pub. No.: WO2022/009929
PCT Pub. Date: Jan. 13, 2022

(65) Prior Publication Data
US 2023/0182544 A1  Jun. 15, 2023

(30) Foreign Application Priority Data

Jul. 9, 2020  (JP) ................................. 2020-118661

(51) Int. Cl.
*B60H 1/34*  (2006.01)
(52) U.S. Cl.
CPC .................................. *B60H 1/3421* (2013.01)
(58) Field of Classification Search
CPC .................................................... B60H 1/3421
(Continued)

(56) References Cited

U.S. PATENT DOCUMENTS

| | | | |
|---|---|---|---|
| 6,589,110 B2 * | 7/2003 | Tanabe | F24F 13/075 454/319 |
| 7,780,508 B2 * | 8/2010 | Okuno | B60H 1/3428 454/109 |

(Continued)

FOREIGN PATENT DOCUMENTS

| | | |
|---|---|---|
| JP | S60-096111 U | 7/1985 |
| JP | 2005-153818 A | 6/2005 |

(Continued)

OTHER PUBLICATIONS

Extended European Search Report for the corresponding European Patent Application No. 21836862.9 dated Dec. 13, 2023.

*Primary Examiner* — Avinash A Savani
*Assistant Examiner* — Dana K Tighe
(74) *Attorney, Agent, or Firm* — Global IP Counselors, LLP (57) ABSTRACT

A ventilator includes a first louver, second louvers, side walls, a first inclined member, and a convex part. The first inclined member is inclined so that an opening area widens from the upstream side to a downstream side. The first inclined member has a vertex of inclination in a cross-sectional view that is positioned at the upstream side. The convex part is arranged adjacent at the upstream side in the airflow direction to the vertex. In a maximum angle state in which the first louver is rotated so that an upstream end part of the first louver is closest to the first inclined member, the upstream end part is positioned further to the downstream side in the airflow direction than the vertex. The convex part projects further to an inside of the flow path than the vertex, and extends across the second louvers when seen along the airflow direction.

10 Claims, 9 Drawing Sheets

(58) Field of Classification Search
USPC .......................................................... 454/155
See application file for complete search history.

(56) References Cited

U.S. PATENT DOCUMENTS

| | | | |
|---|---|---|---|
| 10,189,334 B2 * | 1/2019 | Imaizumi .............. | B60H 1/3421 |
| 10,792,976 B2 * | 10/2020 | Wada .................... | B60H 1/0065 |
| 2002/0178744 A1 | 12/2002 | Tanabe et al. | |
| 2012/0225617 A1 * | 9/2012 | Voigt .................... | B60H 1/3421 |
| | | | 454/155 |
| 2015/0375601 A1 * | 12/2015 | Jeon ..................... | B60H 1/3421 |
| | | | 454/155 |

FOREIGN PATENT DOCUMENTS

| | | | |
|---|---|---|---|
| JP | 2009-083518 A | 4/2009 | |
| JP | 2011-079374 A | 4/2011 | |
| JP | 2012-037134 A | 2/2012 | |
| JP | 2017-214052 A | 12/2017 | |
| JP | 2019-202740 A | 11/2019 | |

* cited by examiner

// VENTILATOR

CROSS-REFERENCE TO RELATED APPLICATIONS

This is a U.S. national phase application of PCT/JP2021/025653, filed on Jul. 7, 2021, which claims priority to Japanese Patent Application No. 2020-118661, filed on Jul. 9, 2020. The entire disclosure of Japanese Patent Application No. 2020-118661 is hereby incorporated herein by reference.

TECHNICAL FIELD

The present invention relates to a ventilator.

BACKGROUND ART

In JP5597423B, disclosed is an air conditioning register comprising a first inclined surface that is inclined to expand facing a vehicle compartment at the top and bottom of an opening part, and fins that are provided inside the opening part and that changes the blowing direction of the vertical direction air by adjusting the vertical direction inclination angle.

SUMMARY

However, in the air conditioning register of JP5597423B, as shown in FIG. 6C of that document, when blowing air facing downward, a portion of the air is blown facing upward. Specifically, with the air conditioning register of JP5597423B, depending on the air blowing direction, a portion of the air flows in the opposite direction to the direction the air is intended to blow.

The inventor of the present application found that the phenomenon of a portion of the air blowing from the opening part when the air conditioning register is blowing air facing downward flowing along a first inclined surface of the upper side (specifically, facing upward) is based on the arrangement of ridges with respect to the fins. Specifically, the inventor of the present application surmised that the phenomenon noted above is caused by the airflow facing the air conditioning register from the duct clinging to the first inclined surface due to the Coanda effect when it passes over the ridges.

Here, the arrangement of the ridges is determined by the design of the air conditioning register. As the design of the air conditioning register, for example, a design is conceivable in which the ridges are at a deep position in the upstream side of the airflow direction inside the air conditioning register, and a first inclined surface extends more toward the downstream side from the upstream side in the airflow direction inside the air condition register compared to the fins. Such a design becomes a design that gives a high grade feel with a sense of depth by having the first inclined surface as a design part penetrate the inside of the air conditioning register. However, as noted above, this design has the problem of the Coanda effect easily occurring because the airflow that faces the air conditioning register from the duct passes directly over the ridges.

In contrast to this, it is also conceivable to suppress the occurrence of the Coanda effect by having the fin itself drawn to the upstream side of the airflow direction in the air conditioning register, closing the space between the fin and the first inclined surface. However, typically, a knob for operating is mounted on the fin (louver), so the knob for operating interferes with the first inclined surface before the fin contacts the first inclined surface, and it is not possible to close the space between the fin and the first inclined surface.

The purpose of the present invention is to suppress the occurrence of the Coanda effect on a member in a ventilator in which the member that forms a portion of an opening part is inclined so that the opening area of the opening part widens facing from the upstream side to the downstream side of the airflow direction.

According to a mode of the present invention, a ventilator in which airflow passes through a flow path and is blown from an opening part comprises: a first louver on which a knob is mounted; a plurality of second louvers that are provided in a direction intersecting the first louver, and that are arranged at the upstream side in the airflow direction from the first louver; a pair of side walls that support the first louver to be able to rotate, and that form a portion of the opening part; and a first inclined member that forms another portion of the opening part between the pair of side walls, and that is inclined so that the opening area of the opening part widens facing the downstream side from the upstream side of the airflow direction. The first inclined member has the vertex of the incline positioned at the upstream side of the airflow direction. In the maximum angle state in which the first louver is rotated so that the upstream end part of the upstream side in the airflow direction of the first louver is closest to the first inclined member, the upstream end part is positioned at the downstream side in the airflow direction from the vertex of the upstream side in airflow direction of the first inclined member, or at the same position in the airflow direction. The ventilator further comprises a convex part arranged adjacent to the vertex at the upstream side in the airflow direction. In the direction orthogonal to both the rotation axis of the first louver and the airflow direction, the convex part projects further to the inside of the flow path than the vertex, and is provided to extend across the plurality of second louvers seen from the airflow direction.

In this mode, by suppressing the airflow from passing through the vertex on the upstream side in the airflow direction of the first inclined member, it is possible to suppress the occurrence of the Coanda effect.

DETAILED DESCRIPTION OF EMBODIMENTS

Following, a ventilator 100 according to an embodiment of the present invention is explained while referring to the drawings.

First, the configuration of the ventilator 100 is explained while referencing FIG. 1 to FIG. 4.

Figure 1:
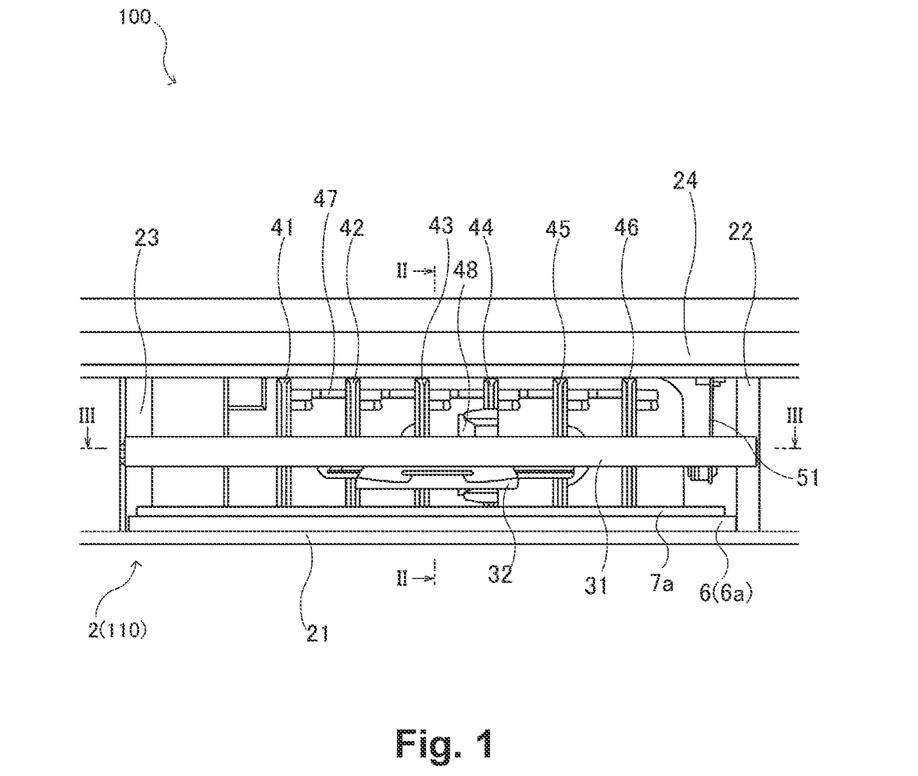
FIG. 1 is a front view of a ventilator according to an embodiment of the present invention.
Figure 2:
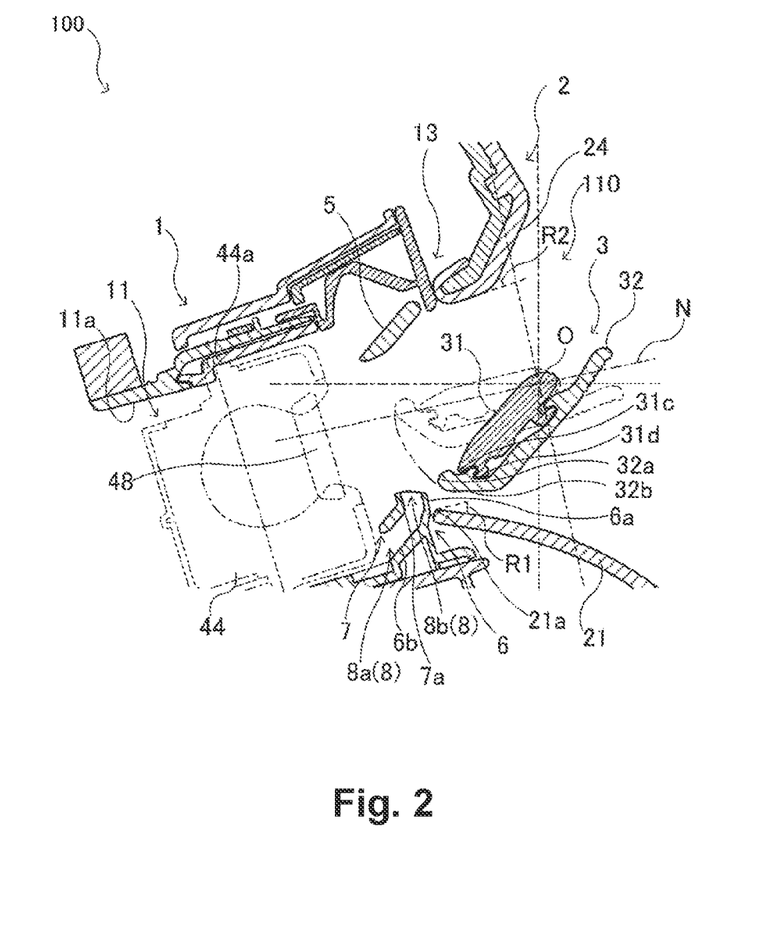
FIG. 2 is a schematic diagram of a cross section when the ventilator of FIG. 1 blows air furthest upward, and is a drawing corresponding to the cross section II-II of FIG. 1.
Figure 3:
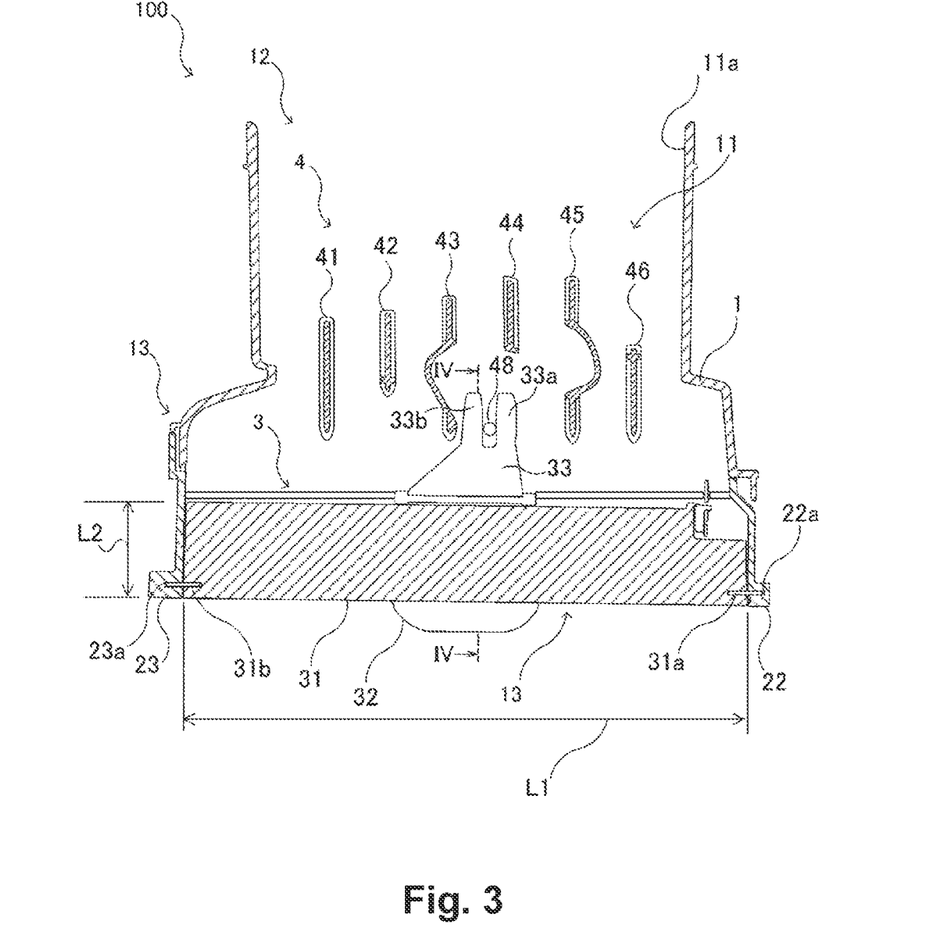
FIG. 3 is a schematic diagram of cross section of FIG. 1.
Figure 4:
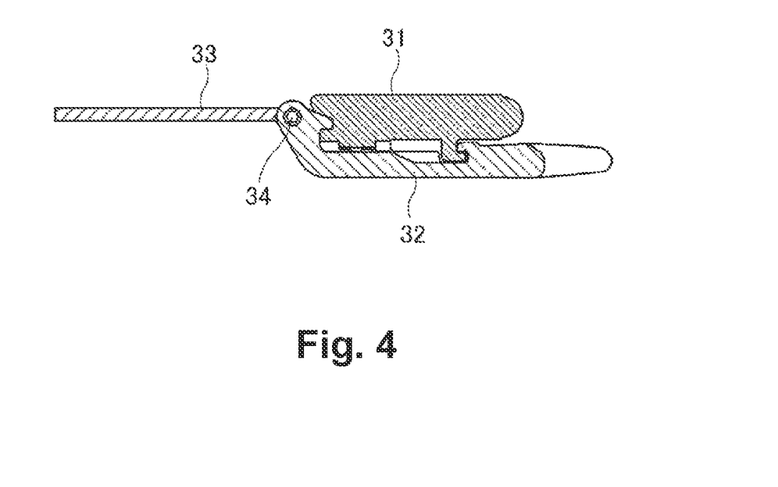
FIG. 4 is a schematic diagram of cross section IV-IV of FIG. 3.

FIG. 1 is a front view of the ventilator 100. FIG. 2 is a schematic diagram of the cross section when the ventilator 100 of FIG. 1 blows the airflow furthest upward, and is a schematic diagram corresponding to cross section II-II of FIG. 1. FIG. 3 is a schematic diagram of cross section of FIG. 1. FIG. 4 is a schematic diagram of cross section IV-IV of FIG. 3.

In FIG. 1, the paper surface vertical direction is the vertical direction of the ventilator 100. The paper surface lateral direction is the lateral direction of the ventilator 100. The paper surface vertical direction is the airflow direction of the ventilator 100.

In FIG. 2, the paper surface left side is the upstream side of the airflow direction in the ventilator 100. The paper surface right side is the downstream side of the airflow direction in the ventilator 100. In FIG. 3, the paper surface upper side is the upstream side of the airflow direction in the ventilator 100. The paper surface lower side is the downstream side of the airflow direction in the ventilator 100.

The ventilator 100 is for vehicles, and for example is provided in the instrument panel, center cluster, etc., of a vehicle compartment. The ventilator 100 guides air for which temperature and humidity have been adjusted by an air conditioning device (not illustrated) inside the vehicle compartment.

As shown in FIG. 1 to FIG. 3, the ventilator 100 comprises a flow path member 1 (also called a housing or case), a bezel part 2, a first louver unit 3, and a second louver unit 4.

The flow path member 1 is an approximately cylindrically shaped member. As shown in FIG. 3, an inflow port 12 and an outflow port 13 open at both ends of the flow path member 1.

As shown in FIG. 2 and FIG. 3, a flow path 11 (space through which air flows) through which airflow can pass is formed inside the flow path member 1. A duct (not illustrated) is connected to the inflow port 12. The airflow sent from the air conditioning device via the duct to the flow path 11 flows in from the inflow port 12. The airflow that flowed into the flow path 11 flows inside the flow path 11, and flows out from the outflow port 13 to the bezel part 2. Rather than the flow for which the direction can be changed by the first louver unit 3 and the second louver unit 4, the direction of the airflow that flows from upstream to downstream as a whole in the flow path 11 interior is called the "airflow direction." Said another way, the "airflow direction" is the extension direction of the flow path 11, or is the direction parallel to an inner wall 11a of the flow path 11. Details of the airflow are described later.

As shown in FIG. 2 and FIG. 3, the bezel part 2 is a part provided at the outflow port 13 side, and is a part that forms an opening part 110 that blows air in the ventilator 100. The bezel part 2 comprises a first inclined member 21, a pair of side walls 22, 23, and an interior panel 24.

As shown in FIG. 1, the first inclined member 21 is a member that forms a portion of the opening part 110 (partitions a portion of the contour of the opening part 110). The first inclined member 21 is arranged at a position at the lower side in the opening part 110. As shown in FIG. 2, the first inclined member 21 is a member of a shape that is inclined so that the opening area of the opening part 110 widens toward the downstream side from the upstream side of the airflow direction inside the ventilator 100 with the surface starting from a vertex 21a. An inclination angle R1 which is the angle between the tangent near the vertex 21a of the first inclined member 21 and the airflow direction (also called the direction when the air flows straight toward the opening part 110 from the inflow port 12; in FIG. 2, shown by a dashed line near the vertex 21a) is within a range in which the Coanda effect, in which the airflow clings to the surface of the first inclined member 21, occurs easily (0 degrees<R1<40 degrees). The Coanda effect occurs particularly easily when the inclination angle R1 is in the range of 0 degrees<R1<30. The Coanda effect occurs markedly most easily when the inclination angle R1 is 24 degrees.

As shown in FIG. 1 and FIG. 2, the first inclined member 21 forms the bottom part in the opening part 110. Normally, the ventilator 100 is arranged below the position of the eye of an occupant inside the vehicle compartment. For that reason, when the occupant views the ventilator 100, the bottom part of the opening part 110 is easy to see. The first inclined member 21 of the present embodiment is a decorative plate (finisher) that the occupant sees inside the vehicle compartment. On the surface of the first inclined member 21 (surface exposed inside the vehicle compartment), it is possible to have plating, painting, film decoration, matte treatment, decoration, etc., implemented, and also possible to be decorated with synthetic leather, genuine leather, wood grain film, etc. As shown in FIG. 2, by having the first inclined member 21 that also functions as a decorative plate penetrate to the back of the opening part 110 (in the range at which the first inclined member 21 at least faces a vertical louver 31) with a gentle incline, a design with a sense of depth in which the decorative plate penetrates the interior of the ventilator 100 is achieved. As a result, it is possible to give the occupant an impression of a high-quality sense. As shown in FIG. 1, with the present embodiment, the first inclined member 21 extends in the width direction beyond the opening part 110 (lateral direction in FIG. 1).

As shown in FIG. 1, the pair of side walls 22, 23 are members that partition the lateral direction of the opening part 110. Specifically, the pair of side walls 22, 23 form a portion of the opening part 110. As shown in FIG. 3, bearing parts 22a, 23a for supporting the vertical louver 31 described later are provided on the pair of side walls 22, 23.

The pair of side walls 22, 23 may also be shaped to imitate the vertical louver 31 such as is disclosed in the specification of European Patent Application Publication No. 0289065 (EP0289065A1). Specifically, at the position of the pair of side walls 22, 23 in FIG. 1, it is also possible to have a structure in which instead of the pair of side walls 22, 23, arranged is a louver imitating side wall which has substantially the same thickness as the vertical louver 31 (the length of the paper surface vertical direction in the vertical louver 31 shown in FIG. 31) and projects facing the paper front side from the paper back side of FIG. 1, so that the louver imitating side wall supports the vertical louver 31. With such a structure, when the vertical louver 31 is positioned in a reference state described later, the vertical louver 31 and the louver imitation side wall are aligned in a straight line, and it appears that there is a wider louver than the actual vertical louver 31.

As shown in FIG. 1, the interior panel 24 is a member arranged at a position above the first inclined member 21, and that faces the first inclined member 21. As shown in FIG. 2, the interior panel 24 is a member that is shaped at an inclination angle that is different from the inclination angle R1 of the first inclined member 21, and that is inclined so that the opening area of the opening part 110 widens facing the downstream side from the upstream side of the airflow direction. An inclination angle R2 which is the angle between the vicinity of the starting point of the inclination at the upstream side of the airflow direction in the interior panel 24 and the airflow direction (line shown by a dashed line in FIG. 2) is 40 degrees or greater.

The interior panel 24 forms the opening part 110 together with the first inclined member 21 and the pair of side walls 22, 23. Said another way, the opening part 110 is formed by the first inclined member 21, the pair of side walls 22, 23, and the interior panel 24.

The interior panel 24 is a decorative plate (finisher) seen by the occupant inside the vehicle compartment, and has the same or different decoration implemented to that of the first inclined member 21.

As shown in FIG. 1 to FIG. 3, the first louver unit 3 has the vertical louver 31 as the first louver, a knob 32, and a fork member 33.

The vertical louver 31 is an approximately plate-shaped member. As shown in FIG. 3, the vertical louver 31 has a width L1 formed to be approximately the same as the width of the opening part 110. Also, in the vertical louver 31, a length L2 (airflow direction length) is formed to be a level at which when the vertical louver 31 is rotating, it does not interfere with the inner wall 11a of the flow path 11, the inner wall of the outflow port 13, or the inner wall of the opening part 110, etc.

The vertical louver 31 is arranged inside the opening part 110 by being supported by the pair of side walls 22, 23. Shaft parts 31a, 31b of the vertical louver 31 are rotation shafts, and are supported by the side walls 22, 23. As a result, the vertical louver 31 can rotate in the vertical direction of the ventilator 100 centered on the rotation center O shown in FIG. 2.

As shown in FIG. 2 and FIG. 4, the knob 32 is a member mounted on the vertical louver 31. The knob 32 is mounted to be able to slide in the lateral direction (width L1 direction of the vertical louver 31 shown in FIG. 3) of the ventilator 100. When the vertical louver 31 rotates in the vertical direction of the ventilator 100 centered on the shaft parts 31a, 31b, the knob 32 rotates in the vertical direction of the ventilator 100 together with the vertical louver 31 (see FIG. 2). As shown in FIG. 2, the shaft part 32a of the knob 32 is the end part at the upstream side in the airflow direction of the knob 32. Also, the end part 32b is the end part closest to the first inclined member 21 in the maximum angle state (details are described later) shown in FIG. 2. As shown in FIG. 2, the knob 32 is mounted to be able to slide on the lower surface (surface facing the first inclined member 21) of the vertical louver 31, so the knob 32 exists partially between the vertical louver 31 and the first inclined member 21. The knob 32 may also be mounted on the vertical louver 31 to wrap around the outer periphery of the vertical louver 31 in the cross section of FIG. 2.

As shown in FIG. 2, by a user moving the knob 32 in the vertical direction, the vertical louver 31 and the knob 32 rotate centered on the rotation axis. The vertical louver 31 changes up and down of the airflow direction flowing from the air conditioning device according to the arrangement within the maximum rotation range which is the range in which rotation is possible.

In the maximum rotation range, the angle of the vertical louver 31 when the ventilator 100 blows the airflow furthest upward is called the "maximum angle," and the state of the vertical louver 31 at that time is called the "maximum angle state" (see FIG. 2). The maximum angle state is the angle at which an upstream end part 31c at the upstream side in the airflow direction of the vertical louver 31 is closest to the first inclined member 21. Also, the end part closest to the first inclined member 21 in the vertical louver 31 in the maximum angle state is called a proximal end part 31d. In FIG. 2, the upstream end part 31c and the proximal end part 31d are at different locations, but they may also be at the same location. Specifically, in the maximum angle state, the upstream end part 31c may be at the location closest to the first inclined member 21 of the vertical louver 31.

On the other hand, in the maximum rotation range, the angle of the vertical louver 31 when the ventilator 100 blows the airflow furthest downward is called the "reverse maximum angle," and the state of the vertical louver 31 at that time is called the "reverse maximum angle state" (see FIG. 6 described later).

Also, in the maximum angle range, the angle of the vertical louver 31 that is parallel to the inner wall 11a of the flow path 11 (angle of the vertical louver 31 shown by the double dot-dash line in FIG. 2) is called the "reference angle." The reference angle is the angle when the ventilator 100 blows air toward the neck of the occupant when an occupant of a prescribed height (e.g., 175 cm) is seated. The state when the vertical louver 31 is at the reference angle is called the "reference state." In FIG. 2, the reference angle is shown by the single-dash line N. In FIG. 2, it looks like there is an angle between the line N and the inner wall 11a of the flow path 11, but in the reference state, both items are actually parallel.

As shown in FIG. 3, the fork member 33 is linked to the end part at the upstream side of the airflow direction of the knob 32. As shown in FIG. 4, the knob 32 and the fork member 33 are connected via a pin 34. As shown in FIG. 3, a pin member 48 of the second louver unit 4 described later is fitted between projections 33a, 33b of the fork member 33.

As shown in FIG. 1 and FIG. 3, the second louver unit 4 has lateral louvers 41 to 46 as a plurality of second louvers, a link member 47, and the pin member 48. As shown in FIG. 3, the second louver unit 4 is arranged further to the upstream side in the airflow direction than the first louver unit 3 inside the flow path 11.

As shown in FIG. 1, the plurality of lateral louvers 41 to 46 are linked with the link member 47 interposed. The lateral louvers 41 to 46 are provided in the direction intersecting the vertical louver 31, and are arranged further to the upstream side in the airflow direction than the vertical louver 31. Also, the lateral louvers 41 to 46 rotate in the lateral direction in FIG. 1 centered on a prescribed shaft part (in FIG. 2, lateral louver 44 and a shaft part 44a of the lateral louver 44 are shown). Of the plurality of lateral louvers 41 to 46, the lateral louver 44 closest to the space between the projections 33a, 33b of the fork member 33 has the pin member 48 provided for connecting the second louver unit 4 and the fork member 33 (see FIG. 1 to FIG. 4).

When the knob 32 and the fork member 33 slide in the lateral direction of the ventilator 100 (width L1 direction of the vertical louver 31 shown in FIG. 3), the pin member 48 rotates in the lateral direction of the ventilator 100 together with that. When the pin member 48 rotates, in conjunction with that, the lateral louvers 41 to 46 tilt toward the rotation direction of the pin member 48 (specifically, the lateral direction of the ventilator 100). The lateral louvers 41 to 46 change the lateral flow direction of the airflow that flows from the air conditioning device according to the inclination state.

As shown in FIG. 2, an auxiliary vertical louver 5 is provided in the flow path 11 inside the flow path member 1. The auxiliary vertical louver 5 is linked to the vertical louver 31 via a connecting member 51 (see FIG. 1). The auxiliary vertical louver 5 rotates in the same direction as the vertical louver 31 and the knob 32 in accordance with rotation of the vertical louver 31 and the knob 32 in the vertical direction of the ventilator 100. The auxiliary vertical louver 5 changes the vertical flow direction of the air flowing from the air conditioning device.

As shown in FIG. 2, a convex member 6 and a guide member 7 are arranged inside the flow path 11 of the flow path member 1.

Here, before explaining the convex member 6 and the guide member 7, details of the arrangement of the vertex 21a of the first inclined member 21 which is an element that determines the arrangement of the convex member 6 and the guide member 7 is explained.

As shown in FIG. 2, the vertex 21a is at the location at which the opening area of the opening part 110 is narrowest in the first inclined member 21. Also, the vertex 21a is the end part at the upstream side in the airflow direction. Specifically, the vertex 21a is the part closest to the outflow port 13 of the flow path member 1 of the first inclined member 21.

As shown in FIG. 2, the vertex 21a is arranged further to the upstream side in the airflow direction than the upstream end part 31c of the vertical louver 31 in the maximum angle state.

Next, the convex member 6 and the guide member 7 are explained.

As shown in FIG. 2, the convex member 6 is arranged at a position adjacent to the vertex 21a of the first inclined member 21 at the upstream side in the airflow direction. The convex member 6 has a convex part 6a and a second inclined part 6b.

The convex part 6a is provided extending across all the lateral louvers 41 to 46 seen from the airflow direction. The convex part 6a is a part projecting more to the inside of the flow path 11 than the vertex 21a. Here, the inside of the flow path 11 is the side facing the direction separating from the inner circumference surface that forms the flow path 11 of the flow path member 1, specifically, the side facing the position of the first louver unit 3 in the reference state shown by the two-dot-dash line in FIG. 2 from the inner wall 11a of the lower side of the flow path member. The convex part 6a can be said to be projecting toward the inside of the flow path 11 in the direction orthogonal to both the rotation axis direction of the vertical louver 31 and the airflow direction (specifically, approximately the vertical direction in FIG. 2). The convex part 6a may also be provided extending across a portion of the lateral louvers 41 to 46 (plurality of lateral louvers among the lateral louvers 41 to 46) seen from the airflow direction.

The convex part 6a, in further detail, projects upward from the proximal end part 31d of the vertical louver 31 in the maximum angle state (height is higher) in the direction orthogonal to both the rotation axis direction of the vertical louver 31 and the airflow direction (specifically, approximately the vertical direction in FIG. 2). Furthermore, the convex part 6a is arranged between the vertical louver 31 and the lateral louvers 41 to 46 in the airflow direction.

The convex part 6a projects 3 mm more than the vertex 21a. Preferably, the convex part 6a projects 3 mm or more from the vertex 21a in the direction noted above in a range in which the first louver unit 3 does not reach the rotation orbit from the reference state to the maximum angle state (arc-shaped double-dot-dash line that connects the position of the end part 32a shown by the solid line in FIG. 2 and the end part 32a shown by the double-dot-dash line in FIG. 2).

As shown in FIG. 2, the second inclined part 6b is an inclined plane that is positioned further to the upstream side in the airflow direction than the convex part 6a, and that is inclined to face the inside of the flow path 11 facing the downstream side from the upstream side of the airflow direction.

As shown in FIG. 2, the guide member 7 is arranged further to the upstream side in the airflow direction than the convex member 6. Also, the guide member 7 has a second convex part 7a. The second convex part 7a projects more toward the inside of the flow path 11 than the proximal end part 31d in the direction orthogonal to both the rotation axis direction of the vertical louver 31 and the airflow direction (specifically, approximately the vertical direction with respect to FIG. 2). In the present embodiment, the second convex part 7a projects facing more to the inside of the flow path 11 than the convex part 6a. In the present embodiment, the second convex part 7a is provided extending across all of the lateral louvers 41 to 46 seen from the airflow direction, but it is also possible to be provided extending across a portion of the lateral louvers 41 to 46) (a plurality of lateral louvers of the lateral louvers 41 to 46) seen from the airflow direction.

The guide member 7 forms a guide flow path 8 together with the convex member 6. The guide flow path 8 is formed so that the flow path cross section area of an outlet 8b is smaller than the flow path cross section area of an inlet 8a.

Figure 5:
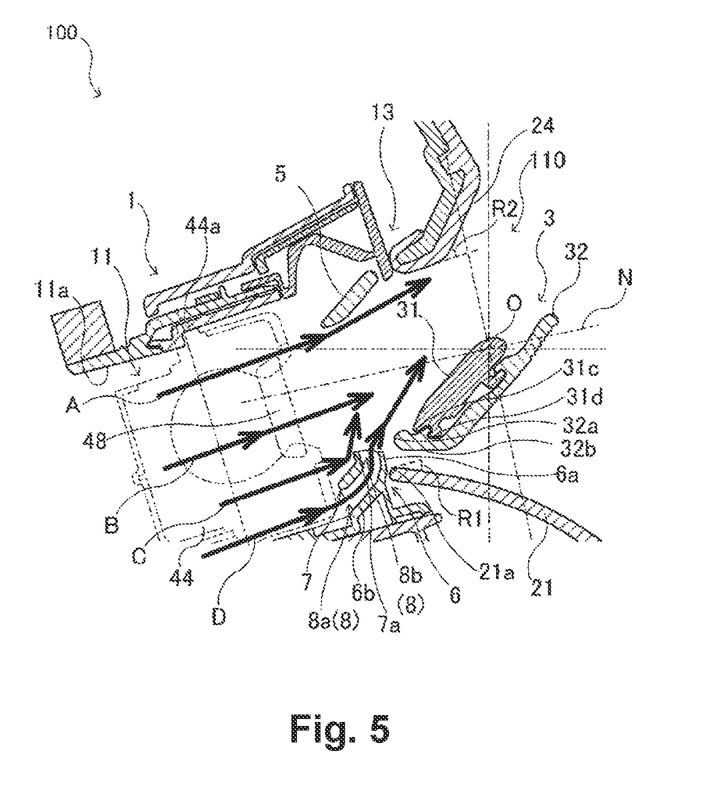
FIG. 5 is a schematic diagram of the cross section when the ventilator blows air furthest upward, and is a drawing corresponding to the cross section II-II of FIG. 1.
Figure 6:
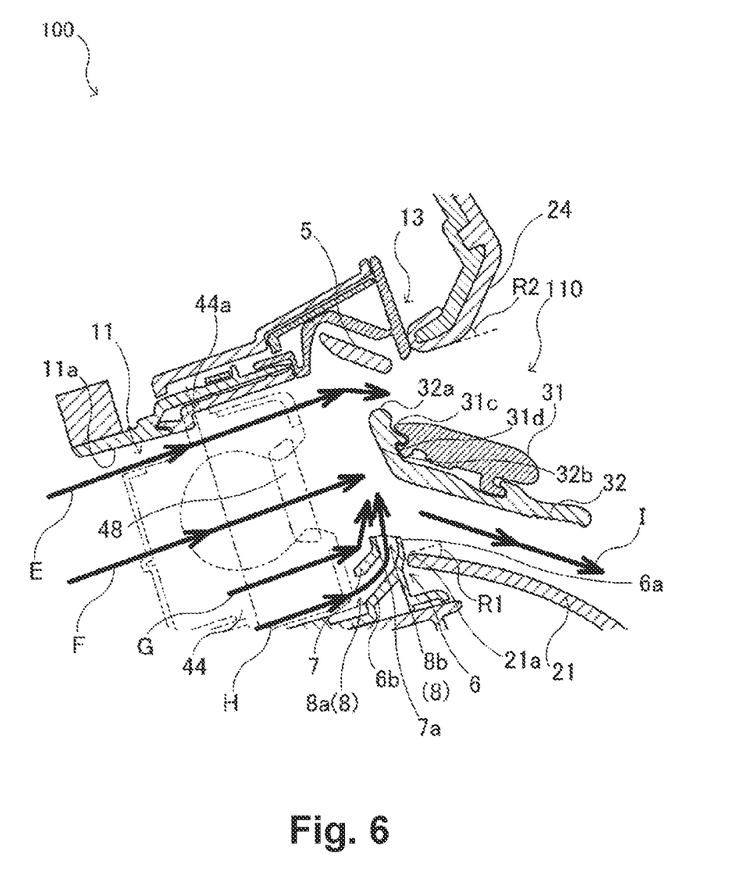
FIG. 6 is a schematic diagram of the cross section when the ventilator blows air the furthest downward, and is a drawing correlating to cross section II-II of FIG. 1.
Figure 9:
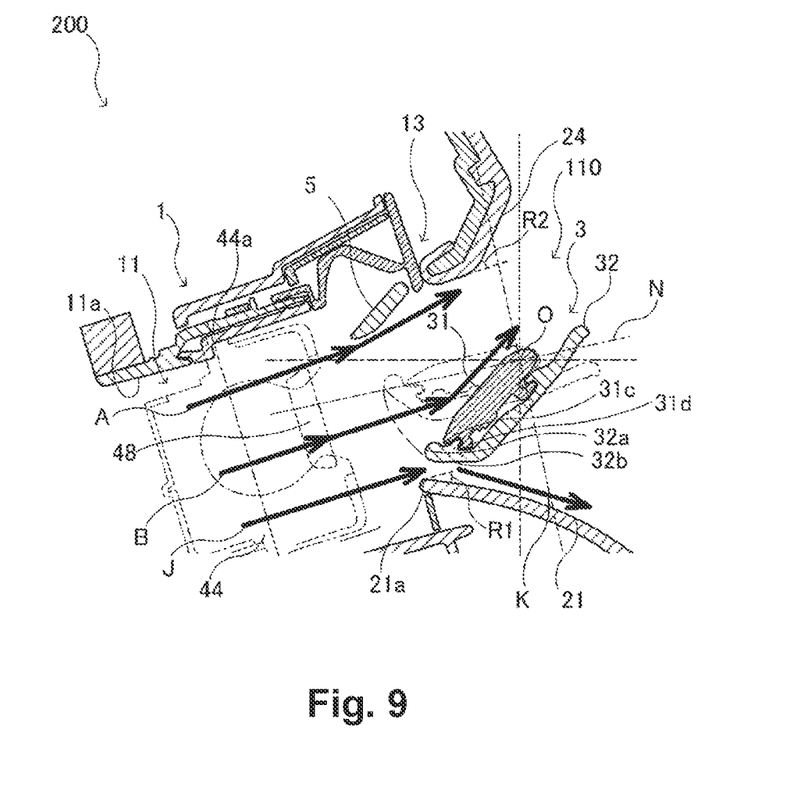
FIG. 9 is a schematic diagram of the cross section of the ventilator according to a comparison example, and is a drawing corresponding to cross section II-II of FIG. 1.

Hereafter, referencing FIG. 5, FIG. 6, and FIG. 9, the action of the ventilator 100 when blowing air is explained.

FIG. 5 is a schematic diagram of the cross section when airflow is blown furthest upward by the ventilator 100, and is a drawing correlating to the II-II cross section in FIG. 1. FIG. 6 is a schematic diagram of the cross section when the ventilator 100 is blowing airflow furthest downward, and is a drawing correlating to the II-II cross section in FIG. 1. FIG. 9 is a schematic diagram of the cross section of a ventilator 200 of a comparison example, and is a drawing correlating to the II-II cross section of FIG. 1. In FIG. 5, FIG. 6, and FIG. 9, the flow of air flowing in the ventilators 100, 200 is shown by arrows A to K.

First, referencing FIG. 5, a case of the airflow blowing the furthest upward is explained. In this case, the first louver unit 3 and the auxiliary vertical louver 5 are at the maximum angle state, and are inclined to face more upward the more downstream the airflow direction faces.

The airflow sent from the air conditioning device flows into the flow path 11 from the inflow port 12 of the flow path member 1. The airflow that flows into the flow path 11 can be roughly divided into the airflow that flows to the upper side of the flow path 11 as shown by arrow A (the paper surface upward side in FIG. 2 of the flow path 11, specifically, the side in which the auxiliary vertical louver 5 is arranged), the airflow that flows to inside the flow path 11 as shown by arrow B (the paper surface center side in FIG. 2 of the flow path 11, specifically, the side nearest the pin member 48), and the airflow that flows to the lower side of the flow path 11 as shown by arrow C and arrow D (the paper surface lower side in FIG. 2 of the flow path 11, the side in which the convex member 6 and the guide member 7 are arranged). Hereafter, each airflow is explained separately.

The airflow that flows to the upper side of the flow path 11 flows inside the flow path 11 as shown by arrow A. Specifically, the airflow that flows to the upper side of the flow path 11 first flows facing the extension direction of the flow path 11 (said another way, to the direction parallel to the inner wall 11a of the flow path 11). Thereafter, that airflow has the flow changed to the upward side of the ventilator 100 by the auxiliary vertical louver 5, and is blown facing upward from the outflow port 13 and the opening part 110.

The airflow that flows to the lower side of the flow path 11 flow insides the flow path 11 as shown by the arrow C or arrow D. Specifically, the airflow that flows to the lower side of the flow path 11 can be divided into cases of not passing through the guide flow path 8 as shown by arrow C and cases of passing through the guide flow path 8 as shown by arrow D.

A case of not passing through the guide flow path 8 as shown by arrow C is explained. In that case, the airflow that flows to the lower side of the flow path 11 first flows facing the extension direction of the flow path 11.

After that, that airflow contacts the second convex part 7a of the guide member 7 and the flow changes to the direction facing the first louver 3. The airflow for which the flow has changed merges with the airflow of arrow B and faces the opening part 110. Here, the convex part 6a is positioned at the downstream side in the airflow direction with respect to the second convex part 7a, and the convex part 6a is adjacent to the vertex 21a of the first inclined member 21. By doing this, it is possible to suppress the merged airflow noted above from wrapping around to the vertex 21a. As a result, it is possible to prevent the occurrence of the Coanda effect of the air clinging to the surface of the first inclined member 21. In particular, in the maximum angle state, the convex part 6a projects more greatly than the proximal end part 31d of the vertical louver 31, so in the maximum angle state, direct flowing of the airflow facing between the first inclined member 21 and the vertical louver 31 is suppressed. Also, even if a portion of the airflow merged with the airflow of arrow C and arrow B wraps around to bypass the convex part 6a, first, as noted above, clinging of the airflow near the vertex 21a is suppressed. Furthermore, the first inclined member 21 is inclined downward facing the downstream side of the airflow direction. Thus, since the first inclined member 21 is inclined downward facing the downstream side of the airflow direction, a portion of that airflow touching the surface of the first inclined member 21 is suppressed.

The "adjacent" range between the convex part 6a and the vertex 21a refers to the distance between the vertex 21a and the convex part 6a in the range in which the airflow that passes over the convex part 6a does not wrap around the vertex 21a, and means that the distance from the vertex 21a to the convex part 6a is approximately 3 mm or less. Provided the distance from the vertex 21a to the second convex part 7a is 3 mm or less, the second convex part 7a and the vertex 21a can be understood as being adjacent.

Here, because the first louver unit 3 and the auxiliary vertical louver 5 are inclined facing upward, the airflow facing the first louver unit 3 is guided to flow upward by the first louver unit 3, and is blown from the outflow port 13 and the opening part 110 facing upward.

A case of passing through the guide flow path 8 as shown by arrow D is explained. In that case, the air flowing to the lower side of the flow path 11 first flows facing the extension direction of the flow path 11.

Thereafter, as shown by arrow D, that air flows toward the outlet 8b from the inlet 8a of the guide flow path 8. The air flowing in the guide flow path 8 has the flow changed to face upward by the second inclined part 6b. Also, as explained above, the guide flow path 8 is formed so that the flow path cross section area of the outlet 8b is smaller than the flow path cross section area of the inlet 8a. Specifically, the guide flow path 8 is formed so that the outlet 8b is narrower than the inlet 8a. For that reason, the guide flow path 8 is able to speed up the flow speed of the air flowing in the guide flow path 8 at the outlet side, causing the airflow to flow out vigorously from the outlet 8b.

The airflow for which the flow speed became faster and the flow changed to upward by passing through the guide flow path 8 merges with the airflow of arrow B as shown by arrow D, and flows toward the vertical louver 31 of the first louver unit 3. The airflow blown from the outlet 8b has a faster flow speed as noted above, so exhibits an effect of pushing the airflow of arrow B to face the upper side. By working in this way, by the airflow of arrow D merging with the airflow of arrow B, the airflow wrapping around to the vertex 21a is suppressed. As a result, it is possible to more effectively prevent the occurrence of the Coanda effect of air clinging to the surface of the first inclined member 21.

The air flowing to inside the flow path 11 flows inside the flow path 11 as shown by arrow B. Specifically, the airflow that flows to inside the flow path 11 first flows facing the extension direction of the flow path 11. After that, that airflow merges with the air flowing facing upward from the lower surface inside the flow path 11 (airflow of the flow of arrow C and arrow D), and the flow changes to the upward side of the ventilator 100. Also, by the airflow contacting the vertical louver 31, the airflow direction changes, flowing facing the upward side along the vertical louver 31, and is blown from the outflow port 13 and the opening part 110.

In this way, even if the airflow that flowed into the flow path 11 of the ventilator 100 from the air conditioning device passes through any of the upper side, the inside, or the lower side in the flow path 11, it is blown well upward from the opening part 110. Said another way, when desiring to blow the airflow upward, having the air flow downward opposite to the intended direction is suppressed.

Here, referring to FIG. 9, the ventilator 200 is explained as a comparison example which is the same as the ventilator 100 shown in FIG. 1 to FIG. 4 other than not comprising the convex member 6 and the guide member 7.

As shown in FIG. 9, with the ventilator 200, the airflow that flows to the lower side of the flow path 11 from the air conditioning device passes through the space between the vertex 21a of the first inclined member 21 and the vertical louver 31 (proximal end part 31d) without the flow changing as shown by arrow J. As explained above, in terms of the structure of the first inclined member 21, the inclination angle R1 which is the angle between the vicinity of the vertex 21a of the first inclined member 21 and the airflow direction (line shown by a dashed line in FIG. 2) is 40 degrees or less.

When this inclination angle R1 is less than 40 degrees (particularly in the range of 0 degrees<R1<30 degrees), when the air flows as shown by arrow J of FIG. 9 of the comparison example, when that airflow contacts the vertex 21a, it flows to the downward side along the first inclined member 21 as shown by arrow K due to the Coanda effect.

Specifically, when there is no convex member 6 or guide member 7, there are cases of the air flowing in the opposite direction to what was intended, as with the air flowing downward despite the vertical louver 31 facing upward.

To prevent the flow of air in this way, it is conceivable to have the vertical louver 31 drawn to the upstream side of the airflow direction, and when in the maximum angle state, the space between the vertical louver 31 and the first inclined member 21 will close.

However, in the ventilator 200 of a structure in which the vertical louver 31 is arranged in the vicinity of the opening part 110, even when the vertical louver 31 is drawn to the rear, before the vertical louver 31 abuts the first inclined member 21, the knob 32 abouts the first inclined member 21. As a result, a gap occurs in the part in which the knob 32 is not interposed between the vertical louver 31 and the first inclined member 21, and the Coanda effect occurs at this part.

In contrast to this, in the ventilator 100 comprising the convex member 6 and the guide member 7, as shown in FIG. 5, when the vertical louver 31 is rotated to the maximum angle, the airflow trying to go to the space between the vertex 21a at the upstream side in the airflow direction of the first inclined member 21 and the proximal end part 31d of the vertical louver 31 (the airflow shown by arrow C in FIG. 5, particularly the airflow facing the vertex 21a of the first inclined member 21) contacts the second convex part 7a before flowing through that space and has the flow changed. Also, because the convex part 6a is adjacent to the vertex 21a, the convex part 6a obstructs the airflow going toward the vertex 21a. For that reason, the airflow wrapping around to that space is suppressed. Therefore, it is possible to prevent the Coanda effect from occurring at the first inclined member 21 and having the airflow pass through that space and flow opposite to the intended direction (flowing as shown by arrow J and arrow K in FIG. 9).

Also, by providing the guide flow path 8 using the second inclined part 6b and the guide member 7, as shown by arrow D in FIG. 5, the air flowing to the lower side of the flow path 11 is guided upward. The air flows facing upward as shown by arrow D in FIG. 5, so by doing this as well, flowing of the airflow to the space between the vertex 21a of the first inclined member 21 and the proximal end part 31d of the vertical louver 31 is suppressed. In particular, it is possible to suppress flowing of the airflow trying to contact the vertex 21a of the first inclined member 21, and to suppress the occurrence of the Coanda effect of the airflow clinging from the vertex 21a.

Furthermore, in the guide flow path 8, the flow path cross section area of the outlet 8b is formed to be smaller than the flow path cross section area of the inlet 8a. Specifically, the outlet 8b of the guide flow path 8 is narrower than the inlet 8a. For that reason, the airflow that passes through the guide flow path 8 has the flow speed made faster, and goes upward vigorously. By doing this as well, it is possible to suppress the occurrence of the Coanda effect of the airflow clinging to the first inclined member 21.

Next, referring to FIG. 6, a case of the airflow being blown furthest downward is explained. In this case, the first louver unit 3 and the auxiliary vertical louver 5 are in the reverse maximum angle state, and are inclined to face downward the further downstream in the airflow direction they are. Specifically, the first louver unit 3 can rotate within a range from the position shown in FIG. 5 to the position shown in FIG. 6 (maximum rotation range).

The ventilator 100 blows air sent from the air conditioning device to the flow path 11 from the inflow port 12 of the flow path member 1. The airflow that flows into the flow path 11 can be roughly divided into the airflow that flows to the upper side of the flow path 11 as shown by arrow E, the airflow that flows to inside the flow path 11 as shown by arrow F, and the airflow that flows to the lower side of the flow path 11 as shown by arrow G and arrow H. Hereafter, each airflow is explained separately.

The air that flows to the upper side of the flow path 11 flows inside the flow path 11 as shown by arrow E. Specifically, the airflow that flows in from the upper side of the flow path 11 first flows facing the extension direction of the flow path 11. After that, that air has the flow changed to the downward side of the ventilator 100 by the auxiliary vertical louver 5, and is blown from the outflow port 13 and the opening part 110 facing the downward side.

However, in the airflow that flows at the upper side of the flow path 11, it is possible that the airflow will flow without contacting the auxiliary vertical louver 5, with the flow left unchanged, in the space between the interior panel 24 and the first louver unit 3. However, even if there is airflow such as that described above, by having the inclination angle R2 of the interior panel 24 be 40 degrees or greater (e.g., 42 degrees), the phenomenon of that air flowing facing upward due to the Coanda effect is suppressed. Specifically, in the reverse maximum angle state, even if the airflow is blown straight from the ventilator 100, having the airflow blown to the upper surface (the opposite direction to the intended direction) is suppressed.

The airflow that flows to inside the flow path 11 flows in the flow path 11 as shown by arrow F. Specifically, the airflow that flows in from inside the flow path 11 first flows facing the extension direction of the flow path 11. Thereafter, that airflow flows facing the downward side along the vertical louver 31 and the knob 32 by contacting the vertical louver 31 and the knob 32 that are inclined facing downward, and is blown from the outflow port 13 and the opening part 110 facing the downward side as shown by arrow I.

The airflow that flows to the lower side of the flow path 11 flows in the flow path 11 as shown by arrow G or arrow H. Specifically, the airflow that flows in from the lower side of the flow path 11 can be divided into a case when it does not flow through the guide flow path 8 as shown by arrow G, and a case when it passes through the guide flow path 8 as shown by arrow H.

The airflow that flows in from the lower side of the flow path 11 as shown by arrow G and arrow H, though it flows facing upward once by the convex part 6a and the second convex part 7a or by the guide flow path 8, it merges with the airflow of arrow F, and soon contacts the first louver unit 3 that is inclined downward. That airflow is guided to flow downward along the first louver unit 3, and is blown from the outflow port 13 and the opening part 110 facing the downward side as shown by arrow I.

In this way, the airflow that flowed into the flow path 11 of the ventilator 100 from the air conditioning device is not blown upward from the opening part 110 even if it passes through any of the upper side, the inside, or the lower side in the flow path 11. Specifically, the airflow does not flow in the opposite direction to the intended direction.

According to the embodiment above, the effects shown hereafter are exhibited.

The ventilator 100 that blows air through the flow path 11 and from the opening part 110 comprises: the vertical louver 31 on which the knob 32 is mounted; the pair of side walls 22, 23 that support the vertical louver 31 to be able to rotate, and that form a portion of the opening part 110; and the first inclined member 21 that forms another portion of the opening part 110 between the pair of side walls 22, 23, and that is inclined so that the opening area of the opening part 110 widens facing the downstream side from the upstream side of the airflow direction. The first inclined member 21 has the vertex 21*a* of inclination that is positioned at the upstream side in the airflow direction. In the maximum angle state in which the upstream end part 31*c* of the upstream side in the airflow direction of the vertical louver 31 has the vertical louver 31 rotated to be closest to the first inclined member 21, the upstream end part 31*c* of the vertical louver 31 is positioned further to the downstream side in the airflow direction than the vertex 21*a*. The ventilator 100 further comprises the convex part 6*a* arranged adjacent at the upstream side in the airflow direction to the vertex 21*a*, and the convex part 6*a* projects further to the inside of the flow path 11 than the vertex 21*a* in the direction orthogonal to both the rotation axis of the vertical louver 31 and the airflow direction.

As a result, when the vertical louver 31 is rotated to the maximum angle state, having the airflow contact the vertex 21*a* of the first inclined member 21 is suppressed by the convex part 6*a*, so it is possible to prevent the occurrence of the Coanda effect with the vertex 21*a*. By doing this, it is possible to suppress flowing of the airflow in the direction opposite to the intended direction.

Also, in a preferred mode, in the maximum angle state, the convex part 6*a* projects further to the inside of the flow path 11 than the position of the proximal end part 31*d* of the vertical louver 31 closest to the first inclined member 21.

As a result, when the vertical louver 31 is rotated to the maximum angle state, flowing of the airflow to the space between the vertex 21*a* of the first inclined member 21 and the proximal end part 31*d* of the vertical louver 31 is suppressed by the convex part 6*a*. Therefore, the occurrence of the Coanda effect with the first inclined member 21 is suppressed, and it is possible to effectively prevent the airflow from passing through that space and flowing opposite to the intended direction.

Also, the ventilator 100 further comprises the second inclined part 6*b* that is adjacent to the convex part 6*a* at the upstream side in the airflow direction, and that is inclined facing the inside of the flow path 11 in the direction facing the downstream side from the upstream side of the airflow direction.

As a result, the airflow that flows at the lower side of the flow path 11 is guided to face upward. For that reason, in the maximum angle state, flowing of the airflow in the space between the vertex 21*a* of the first inclined member 21 and the proximal end part 31*d* of the vertical louver 31 is suppressed by that airflow. Therefore, the occurrence of the Coanda effect with the first inclined member 21 is suppressed, and it is possible to prevent the airflow from passing through that space and flowing opposite to the intended direction (flowing as shown by arrow J and arrow K of FIG. 9).

Also, the ventilator 100 further comprises the guide member 7 that forms the guide flow path 8 together with the second inclined part 6*b*, and the guide member 7 has the second convex part 7*a* that projects further to the inside of the flow path 11 than the vertex 21*a*. In more detail, the second convex part 7*a* projects further to the inside of the flow path 11 than the proximal end part 31*d*.

As a result, in the maximum angle state, the flowing of the airflow to the space between the vertex 21*a* at the upstream side in the airflow direction of the first inclined member 21 and the proximal end part 31*d* of the vertical louver 31 is also suppressed by the second convex part 7*a*. Therefore, it is possible to prevent the airflow from passing through that space and flowing opposite to the intended direction.

The second convex part 7*a* projects more greatly to inside the flow path 11 than the convex part 6*a*. However, the second convex part 7*a* has a reduced effect on appearance because it is positioned in the back side of the flow path 11 when the flow path 11 is seen from the direction of the opening part 110. Specifically, by making the convex part 6*a* that is easy for the occupant to see smaller, and making the second convex part 7*a* that is relatively difficult to see by the occupants larger, suppression of the occurrence of the Coanda effect is achieved while reducing the effect on the appearance.

Also, as shown in FIG. 1, when the flow path 11 is seen from the direction of the opening part 110, the convex part 6*a* and the second convex part 7*a* appear to be in step form. If the convex part 6*a* is approximately the same height as the second convex part 7*a*, when the flow path 11 is seen from the opening part 110, in contrast to the wall surface of the convex part 6*a* (surface that can be seen in FIG. 1) being visibly conspicuous, being in the kind of step form shown in FIG. 1 is a contrivance that makes it visually inconspicuous.

Also, the outlet 8*b* of the guide flow path 8 is narrower than the inlet 8*a* of the guide flow path 8.

As a result, the airflow that flows inside the guide flow path 8 is flowed out vigorously upward from the outlet 8*b*. By doing this as well, in the maximum angle state, flowing of the airflow in the space between the vertex 21*a* of the upstream side in the airflow direction of the first inclined member 21 and the proximal end part 31*d* of the vertical louver 31 is suppressed.

Above, embodiments of the present invention were explained, but the embodiments merely show a portion of the application examples of the present invention, and are not intended to limit the technical scope of the present invention to specific configurations of the above embodiments.

In the embodiments above, a case was explained in which the first inclined member 21 is arranged below the opening part 110, and in the maximum angle state, the first louver unit 3 is inclined upward. However, it is also possible to apply the abovementioned configuration in a case when the first inclined member 21 is arranged above the opening part 110, and in the maximum angle state, the first louver unit 3 is inclined downward. Also, in a case when the lateral louvers 41 to 46 are arranged further to the inside of the vehicle compartment than the vertical louver 31 (this can be understood as a case when a configuration such as in FIG. 1 is inclined by 90 degrees and arranged inside the vehicle compartment), it is possible to apply the abovementioned configuration with the abovementioned vertical louver 31 being replaced by the louver closest to the first inclined member 21 among the lateral louvers 41 to 46.

Figure 7:
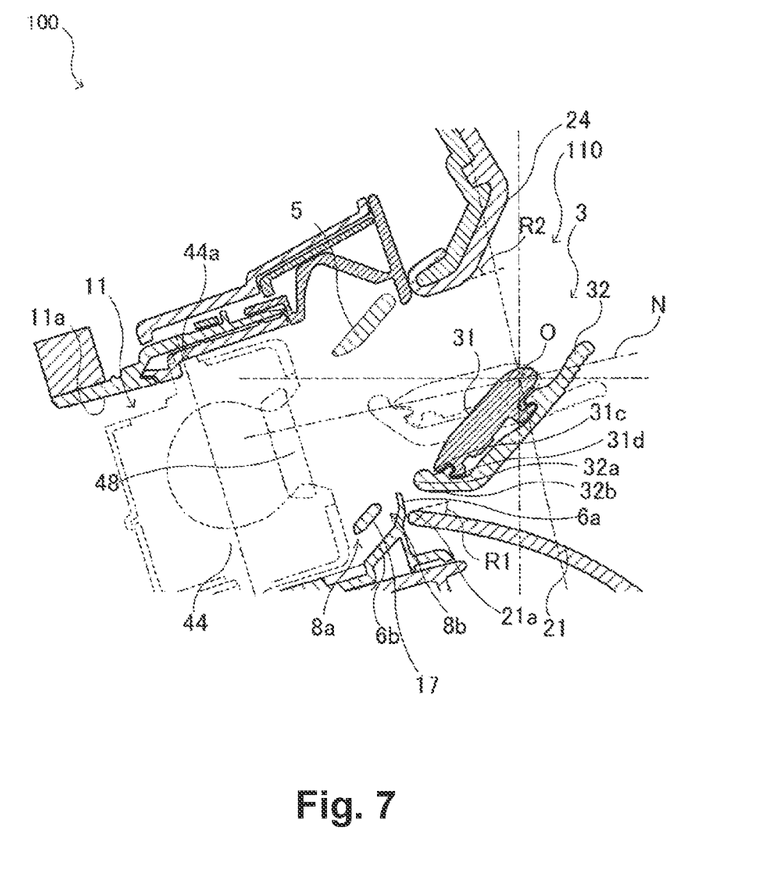
FIG. 7 is a schematic diagram of the cross section of the ventilator according to a modified example of the embodiment of the present invention, and is a drawing correlating to cross section II-II of FIG. 1.

Also, as shown by the modification example shown in FIG. 7, it is also possible to have a configuration in which a guide member 17 does not comprise the second convex part 7*a*. In that configuration as well, if there is the convex part 6*a*, wrapping around of the airflow to the vertex 21*a* of the upstream side in the airflow direction of the first inclined member 21 is suppressed.

Figure 8:
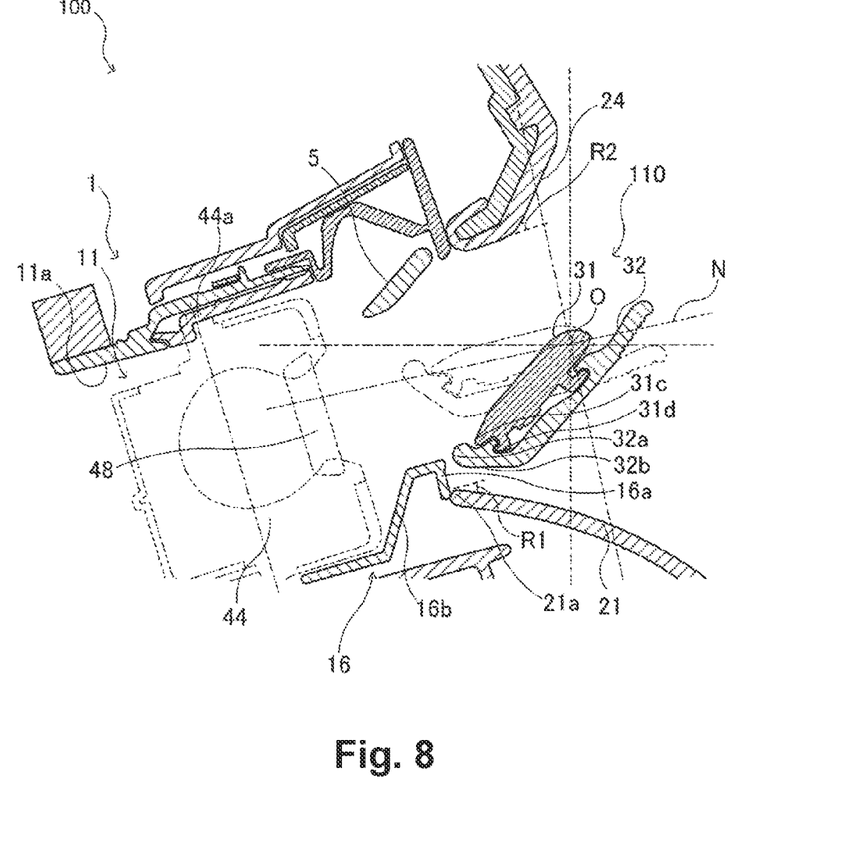
FIG. 8 is a schematic diagram of the cross section of the ventilator of another modification example of the embodiment of the present invention, and is a drawing corresponding to cross section II-II of FIG. 1.

Also, as shown by another modification example shown in FIG. 8, it is also possible to have a configuration that comprises a second inclined member 16 instead of the convex member 6 and the guide member 7.

The second inclined member 16 has a convex part 16*a* and an inclined part 16*b*. The convex part 16*a* and the inclined part 16*b* are formed integrally.

The convex part 16a, the same as the convex part 6a noted above, is adjacent to the vertex 21a of the first inclined member 21, so it is possible to suppress wrapping around of the airflow to the vertex 21a. As a result, the flowing of air in that space is suppressed.

The inclined part 16b, the same as the second inclined part 6b noted above, guides the air flowing to the lower side of the flow path 11 to face upward. As a result, the flowing of air in the space between the vertex 21a of the upstream side in the airflow direction of the first inclined member 21 and the proximal end part 31d of the vertical louver 31 is suppressed.

According to the ventilator 100 of this modification example as well, it is possible to prevent the airflow from passing through that space and flowing opposite to the intended direction (flowing as shown by arrow J and arrow K of FIG. 9).

The invention claimed is:

1. A ventilator configured to blow air through a flow path from an opening part, the ventilator comprising:
   a first louver on which a knob is mounted;
   a plurality of second louvers each extending in a direction intersecting a longitudinal direction of the first louver, and arranged further to an upstream side in an airflow direction than the first louver;
   a pair of side walls rotatably supporting the first louver, and the side walls defining a portion of the opening part;
   a first inclined member defining a portion of the opening part between the pair of side walls, and the first inclined member being inclined so that an opening area of the opening part widens from the upstream side to a downstream side in the airflow direction, the first inclined member having a vertex of inclination in a cross-sectional view that is positioned at the upstream side in the airflow direction; and
   a convex part arranged adjacent at the upstream side in the airflow direction to the vertex, wherein
   in a maximum angle state in which the first louver is rotated so that an upstream end part of the first louver is closest to the first inclined member, the upstream end part is positioned further to the downstream side in the airflow direction than the vertex,
   the convex part projects further to an inside of the flow path than the vertex in a direction orthogonal to both a rotation axis of the first louver and the airflow direction, and the convex part extends across the plurality of second louvers when seen along the airflow direction, and
   in the direction orthogonal to both the rotation axis of the first louver and the airflow direction, in the maximum angle state, the convex part projects further inside the flow path than a position of a proximal end part of the first louver closest to the first inclined member.

2. The ventilator according to claim 1, wherein the convex part is arranged between the first louver and the second louvers in the airflow direction.

3. The ventilator according to claim 2, further comprising a second inclined part arranged adjacent to the convex part at the upstream side in the airflow direction, and the second inclined part being inclined toward the inside of the flow path along the airflow direction.

4. The ventilator according to claim 3, further comprising a guide member that, together with the second inclined part, defines a guide flow path configured to guide the airflow toward the inside of the flow path, wherein the guide member has a second convex part projecting further to the inside of the flow path than the vertex in the direction orthogonal to both the rotation axis of the first louver and the airflow direction.

5. The ventilator according to claim 4, wherein an outlet of the guide flow path is narrower than an inlet of the guide flow path.

6. The ventilator according to claim 3, further comprising a second convex part positioned further to the upstream side in the airflow direction than the convex part, and the second convex part projecting further to the inside of the flow path than the vertex in the direction orthogonal to both the rotation axis of the first louver and the airflow direction, wherein the second convex part projects further to the inside of the flow path than the convex part.

7. The ventilator according to claim 1, further comprising a second inclined part arranged adjacent to the convex part at the upstream side in the airflow direction, and the second inclined part being inclined toward the inside of the flow path along the airflow direction.

8. A ventilator configured to blow air through a flow path from an opening part, the ventilator comprising:
   a first louver on which a knob is mounted;
   a plurality of second louvers each extending in a direction intersecting a longitudinal direction of the first louver, and arranged further to an upstream side in an airflow direction than the first louver;
   a pair of side walls rotatably supporting the first louver, and the side walls defining a portion of the opening part;
   a first inclined member defining a portion of the opening part between the pair of side walls, and the first inclined member being inclined so that an opening area of the opening part widens from the upstream side to a downstream side in the airflow direction, the first inclined member having has a vertex of inclination in a cross-sectional view that is positioned at the upstream side in the airflow direction;
   a convex part arranged adjacent at the upstream side in the airflow direction to the vertex;
   a second inclined part arranged adjacent to the convex part at the upstream side in the airflow direction, and the second inclined part being inclined toward the inside of the flow path along the airflow direction; and
   a guide member that, together with the second inclined part, defines a guide flow path configured to guide the airflow toward the inside of the flow path, wherein
   in a maximum angle state in which the first louver is rotated so that an upstream end part of the first louver is closest to the first inclined member, the upstream end part is positioned further to the downstream side in the airflow direction than the vertex,
   the convex part projects further to an inside of the flow path than the vertex in a direction orthogonal to both a rotation axis of the first louver and the airflow direction, and the convex part extends across the plurality of second louvers when seen along the airflow direction, and
   the guide member has a second convex part projecting further to the inside of the flow path than the vertex in the direction orthogonal to both the rotation axis of the first louver and the airflow direction.

9. The ventilator according to claim 8, wherein an outlet of the guide flow path is narrower than an inlet of the guide flow path.

10. A ventilator configured to blow air through a flow path from an opening part, the ventilator comprising:
a first louver on which a knob is mounted;
a plurality of second louvers each extending in a direction intersecting a longitudinal direction of the first louver, and arranged further to an upstream side in an airflow direction than the first louver;
a pair of side walls rotatably supporting the first louver, and the side walls defining a portion of the opening part;
a first inclined member defining a portion of the opening part between the pair of side walls, and the first inclined member being inclined so that an opening area of the opening part widens from the upstream side to a downstream side in the airflow direction, the first inclined member having a vertex of inclination in a cross-sectional view that is positioned at the upstream side in the airflow direction;
a convex part arranged adjacent at the upstream side in the airflow direction to the vertex; and
a second convex part positioned further to the upstream side in the airflow direction than the convex part, and the second convex part projecting further to the inside of the flow path than the vertex in the direction orthogonal to both the rotation axis of the first louver and the airflow direction, wherein
in a maximum angle state in which the first louver is rotated so that an upstream end part of the first louver is closest to the first inclined member, the upstream end part is positioned further to the downstream side in the airflow direction than the vertex,
the convex part projects further to an inside of the flow path than the vertex in a direction orthogonal to both a rotation axis of the first louver and the airflow direction, and the convex part extends across the plurality of second louvers when seen along the airflow direction, and
the second convex part projects further to the inside of the flow path than the convex part.

* * * * *